UNITED STATES PATENT OFFICE.

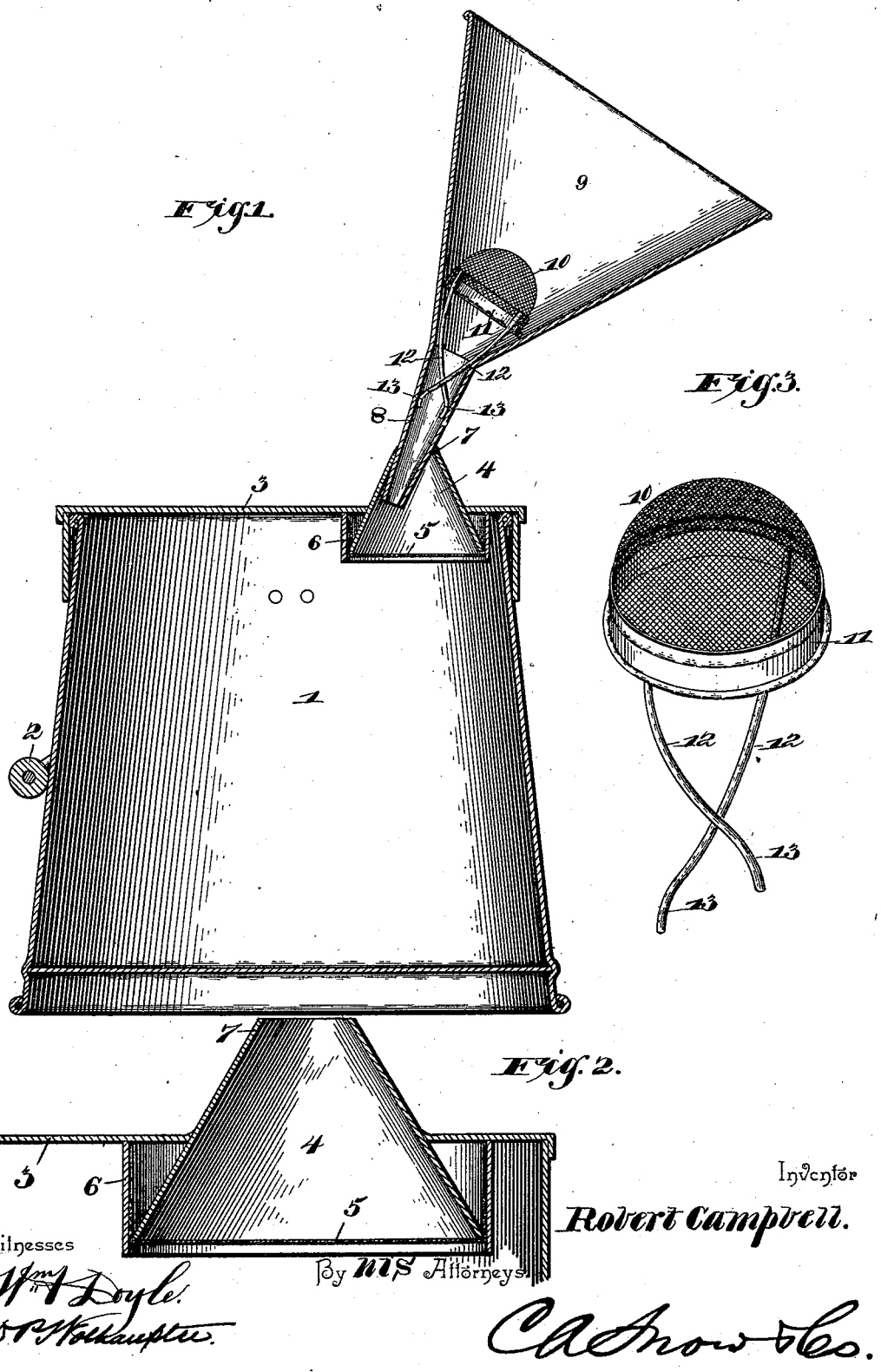

ROBERT CAMPBELL, OF SOUTH HAVEN, MICHIGAN.

MILK-PAIL.

SPECIFICATION forming part of Letters Patent No. 527,768, dated October 23, 1894.

Application filed April 6, 1894. Serial No. 506,622. (No model.)

*To all whom it may concern:*

Be it known that I, ROBERT CAMPBELL, a citizen of the United States, residing at South Haven, in the county of Van Buren and State of Michigan, have invented a new and useful Milk-Pail, of which the following is a specification.

This invention relates to milk pails; and it has for its object to effect certain improvements in that class of milk pails employed as a stool for the operator to sit upon while milking the cow.

To this end the main and primary object of the present invention is to provide a new and useful milk pail of this character having novel and efficient means for thoroughly straining the milk directly as it comes from the cow, and furthermore to provide a milk pail of this character having strainer devices that are readily separable, so that ready and quick access may be had to every part of the pail and its straining devices for the purpose of cleaning, &c.

With these and other objects in view which will readily appear as the nature of the invention is better understood, the same consists in the novel construction, combination and arrangement of parts hereinafter more fully described, illustrated and claimed.

In the accompanying drawings:—Figure 1 is an enlarged central vertical sectional view of a milk pail provided with the herein-described improvements. Fig. 2 is an enlarged detail sectional view of the strainer devices at the top of the pail proper. Fig. 3 is a detail in perspective of the removable cup strainer for the receiving funnel.

Referring to the accompanying drawings, 1 designates a metallic milk pail of the ordinary general construction and shape. The pail 1, is provided with an ordinary handle bail 2, for carrying the same about, and is adapted to be removably inclosed in the top by the flanged cover 3, which also affords a seat for the operator to sit upon while milking the cow. A conical tube 4, is fitted within the cover 3, and is secured fast therein by means of solder or other suitable fastening means so as to make the said tube a substantial part of the pail cover. The conical tube 4, projects above and below the cover 3, and is adapted to have the inner flared or widened end thereof covered by an inner strainer cap 5, made of cloth or metal as may be found expedient, and held at its edges by the retaining ring or band 6, that is removably fitted over the inner flared end of the conical tube 4, for the purpose of removably securing the strainer 5, in position, so that the same may be easily removed for the purpose of cleaning and also readily replaced again in its proper position over the inner flared end of the conical tube.

The small end of the conical tube, 4, projects through and above the pail cover 3, and is provided at or near its apex with the top opening 7, that removably receives the spout 8, of the receiving funnel 9. The funnel spout 8, is preferably disposed at an angle to the vertical center of the funnel 9, so that when the said spout 8, is inserted into the top opening of the tube 4, the receiving funnel will be disposed forwardly at an angle from the operator, so as to be projected forwardly under the cow into a convenient position for receiving the milk taken from the cow, it being understood that with the operator sitting on top of the pail, the receiving funnel 9, will be steadied and held between the knees of the operator so as to be perfectly under his control for removal or adjustment when necessary.

In order to secure a complete straining of the milk as it issues from the cow a primary strainer is used in connection with the receiving funnel, and I preferably employ an inverted strainer cup 10. The inverted strainer cup 10, consists of a wire gauze or other suitable screen material secured at its edges in a cup rim 11, and projected from opposite sides of the rim of the cup are the opposite crossed spring wire securing arms 12. The spring wire securing arms 12, are provided with angularly disposed engaging ends 13, that are normally separated from each other, and are adapted to engage against opposite inner sides of the funnel spout 8. The inverted strainer cup 10, is placed in position within the receiving funnel 9, at the apex thereof, and the compressible spring wire arms 12, are inserted down into the funnel spout 8, against the inner sides of which they clamp to secure the strainer cup firmly in position. To remove the strainer cup it is simply necessary to grasp the same with the hand and draw the arms 12 out of the funnel spout.

From the above it will be obvious that the milk which is taken from the cow and delivered into the receiving funnel 9, is subjected to two distinct and separate straining operations before it reaches the interior of the pail, and by this means dirt and foreign substances are absolutely prevented from passing into the pail, while at the same time the separable and removable connections between all of the parts of the device provide ready and convenient means for quickly and easily cleaning every part of the device of any accumulations of dirt or sediment. It is to be also observed that the herein-described pail provides means for covering the milk and prevents the cow from kicking into the milk or otherwise destroying the same, and it will be understood that changes in the form, proportion and the minor details of construction, may be resorted to without departing from the principles or sacrificing any of the advantages of this invention.

Having thus described the invention, what is claimed, and desired to be secured by Letters Patent, is—

1. The combination of a milk pail cover provided with a conical tube projected above and below the same, a strainer cap removably fitted over the inner end of said tube, a milk receiving funnel having its spout disposed at an angle and adapted to removably fit within the outer end of said tube, and a strainer cup removably secured within said receiving funnel, substantially as set forth.

2. The combination with a milk pail; of a pail cover having a tube extending above and below the same, a removable receiving funnel adapted to have its spout fit into the upper end of said tube, and a removable inverted strainer cup adapted to be arranged within the receiving funnel and provided with compressible spring wire securing arms adapted to engage within the spout of the funnel, substantially as set forth.

In testimony that I claim the foregoing as my own I have hereto affixed my signature in the presence of two witnesses.

ROBERT CAMPBELL.

Witnesses:
S. EDNA WARD,
C. F. HUNT.